April 27, 1954 P. C. GOLDMARK 2,676,807

PHONOGRAPH·REPRODUCER ARM ASSEMBLY

Filed May 29, 1948

INVENTOR
PETER C. GOLDMARK
BY
Pennie, Edmonds, Morton & Barrows
ATTORNEYS

Patented Apr. 27, 1954

2,676,807

UNITED STATES PATENT OFFICE 2,676,807

PHONOGRAPH REPRODUCER ARM ASSEMBLY

Peter C. Goldmark, New Canaan, Conn., assignor to Columbia Broadcasting System, Inc., New York, N. Y., a corporation of New York Application May 29, 1948, Serial No. 30,024

10 Claims. (Cl. 274—23)

This invention relates to phonograph reproducer arms, and particularly to the provision of damping in the mounting of such arms.

Phonograph reproducer or pickup arm assemblies commonly have an arm of desired length which is coupled to a fixed support for movement in both lateral and vertical directions. A stylus is mounted at the end of the arm remote from the support for engagement with a record surface. The usual stylus mounting is a suspension which provides lateral and vertical compliance. In the case of lateral-cut records the lateral compliance allows the stylus to follow the lateral variations in the modulated groove but provides a restoring force which tends to maintain the stylus in mid-position. Vertical compliance is provided to decrease needle talk and to allow the stylus to follow uneven surfaces without difficulty. Commonly the coupling between arm and fixed support is made as frictionless as possible so as not to impair the movement of the arm and stylus. Free lateral movement permits the stylus to follow the record groove spiral without difficulty, and free vertical movement allows the stylus to follow warped records, etc.

Adopting the terminology of mechanical-electrical analogies, the compliance of the stylus suspension provides a mechanical reactance which is analogous to the reactance of a capacitor in an electrical circuit. Similarly, the dynamic mass of the arm and cartridge assembly provides a mechanical reactance of opposite sign, analogous to inductive reactance in an electrical circuit. At the frequency where the compliance and the dynamic mass have equal mechanical reactances of opposite sign, a resonance occurs. Such a resonance affects both the electrical output of the pickup cartridge (crystal, electromagnetic, etc.) and the mechanical stability of the arm in tracking.

The electrical effect due to resonance produces a sharp peak in the output of the pickup cartridge at the resonant frequency. This is undesirable since it destroys the linearity of response. The mechanical instability of tracking renders the reproducer assembly vulnerable to vibration and sudden shocks. The pickup arm is thus likely to jump grooves even for relatively slight jars.

In the past it has been common to choose the effective mass of the arm and the compliance of the stylus suspension so that the resonant frequency occurs below the useful frequency range to be reproduced. While this produces uniform electrical output within the useful frequency range, there is still considerable mechanical instability which makes the turntable assembly very critical with respect to mechanical shock and vibration.

Various attempts have been made to damp out the low-frequency resonant oscillations. Damping has commonly been provided in the pickup cartridge located at the end of the arm, and particularly in the pivot about which the stylus assembly oscillates. The amount of damping which can be provided in the pivot of the stylus assembly is limited by the necessity of allowing the stylus to follow accurately the modulation of the groove without excessive needle pressure. The present tendency is to reduce needle pressure to a minimum so as to reduce record wear and noise. For example, needle pressures of 15 grams and less have been employed with success. Thus the damping which can be provided at the pivot of the stylus assembly is too small to be very effective in damping the low-frequency resonance of the arm. Further damping may be provided between the stylus assembly and the point at which the pickup cartridge is rigidly attached to the arm, but this imposes rather severe limitations on the design of the pickup cartridge.

A new solution to the problem of reducing or eliminating low-frequency resonant oscillations in phonograph pickup arms is described in patent application Serial No. 29,997, filed May 29, 1948, by William S. Bachman and entitled "Phonograph Reproducer Arms." It is there proposed to introduce mechanical resistance in the coupling between the reproducer arm and the mounting support. The amount of mechanical resistance so introduced may be predetermined with respect to the mass of the arm and the compliance of the stylus suspension to yield the desired amount of damping. A number of specific embodiments providing the desired mechanical resistance are described.

The present invention is a development along the foregoing line. A coupling is provided for allowing lateral rotation, and the reproducer arm is attached to the coupling by a spring which allows vertical movement. Advantageously a simple vertical bearing is employed with a flat horizontally-disposed metallic leaf spring as the coupling elements. Damping is provided by a flexible damping material having substantial mechanical resistance affixed between the arm and the coupling which allows lateral rotation, so as to provide mechanical resistance to movement of the arm in a vertical direction. Advantageously the flexible damping material is in the form of one or more flat sheets contiguous with the spring.

The flexible or pliable damping material preferably has a high mechanical resistance and low restoring force. A material exhibiting pure mechanical resistance would be advantageous, but solids customarily exhibit at least some restoring force which gives a reactive component. A relatively high ratio of mechanical resistance to restoring force is hence advantageous.

Flexible or pliable viscous solids have been employed with success. Such solids exhibit high mechanical resistance and low restoring force, and hence function well. An example is the pliable cellulose nitrate plastic of the type sold under the tradename "Pyralin," and sometimes referred to as "Pyralin vibration damping stock." A sheet of such material exhibits elastic lag, that it, after being bent it tends to return slowly to its initial state. This is perhaps due to the fact that its internal mechanical resistance prevents its relatively weak restoring force from returning the sheet quickly to its unstrained condition.

The invention will be more fully understood from the following description of a specific embodiment thereof, taken in conjunction with the accompanying drawings in which.

Figure 1:
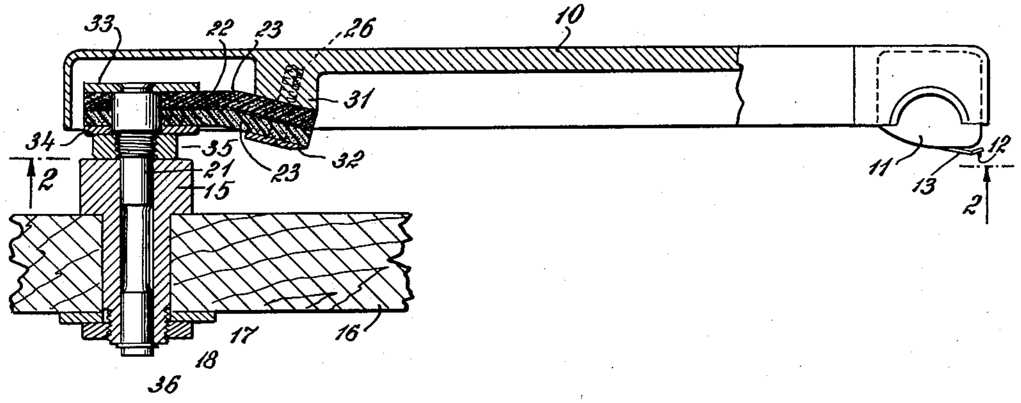
Fig. 1 is a side view, partially in cross-section, taken along the line 1—1 of Fig. 2, showing a reproducer arm assembly in accordance with the invention for reproducing laterally-modulated record grooves.
Figure 2:
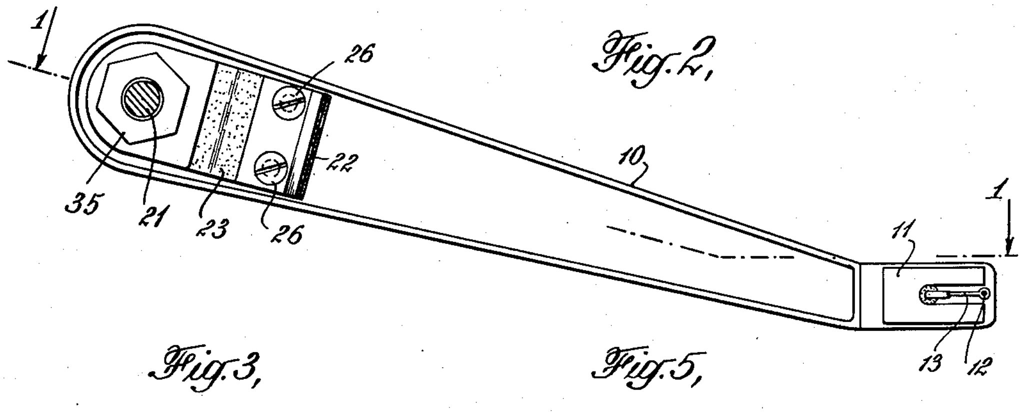
Fig. 2 is a view of the underside of the arm, with the vertical pivot in section along the line 2—2 of Fig. 1.

The reproducer arm assembly includes a rigid arm 10 of any desired material, such as a metal or a plastic. Advantageously it may be made of aluminum alloy for strength and lightness. At the free end of the arm is mounted a pickup cartridge 11 having an associated stylus 12. While any type of pickup cartridge may be employed, as desired, the type shown is a crystal cartridge having a permanent stylus fixed to the end of a suitable cantilever suspension 13. The cantilever provides horizontal and vertical compliance, and additional compliance may be provided in the cartridge if desired. As shown specifically, the pickup cartridge 11 is adapted to be pressed into a suitably shaped cavity at the end of pickup arm 10 and is retained there by friction. Any other desired form of stylus mounting may be employed.

A coupling is provided at the other end of arm 10 to allow lateral rotation thereof about a mounting support. As specifically shown, the coupling is a vertical pivotal bearing comprising a bearing support 15 secured to a support plate 16 by means of washer 17 and nut 18. The support plate 16 may be the mounting plate for the turntable and associated motor. Spindle 21 of the vertical bearing is mounted for rotation in bearing support 15. The pickup arm 10 is attached to the upper end of spindle 21 by means of a flat leaf spring 22 and associated damping layers 23. The spring is horizontally disposed to allow the arm to move in a vertical direction.

Figure 5:
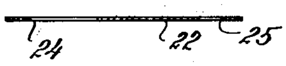
Figs. 5 and 6 are section and plan views of the horizontal leaf spring.

Spring 22 is a metallic leaf spring which, in its unstrained position, is flat as shown in Fig. 5. It is provided with a hole 24 to encircle the upper portion of spindle 21, and holes 25 to encircle screws 26 which attach it to the arm 10.

Figure 3:
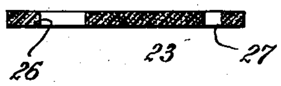
Figs. 3 and 4 are section and plan views of one of the damping layers.
Figure 4:
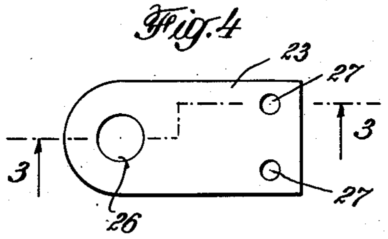

One of the damping layers 23 is shown in Figs. 3 and 4 and is advantageously formed of a pliable cellulose nitrate plastic of the type known as "Pyralin vibration damping stock." Each sheet is provided with a hole 26 which encircles the upper portion of spindle 21 and holes 27 which encircle mounting screws 26.

At the pickup arm, the spring 22 and sheets of damping material 23 are clamped between abutment 31 of the arm and clamping plate 32 by means of screws 26. At the spindle, the spring and damping layers are clamped between plate 33, fixedly attached to the upper end of spindle 21, and plate 34 by means of nut 35. Nut 35 is in rotating contact with the upper portion of bearing support 15 and a thrust washer may be provided between the two if desired. Spindle 21 is held in bearing support 15 by means of a spring retaining clip 36. It will be understood that other suitable forms of coupling may be provided for allowing lateral movement of the pickup arm.

Figure 6:
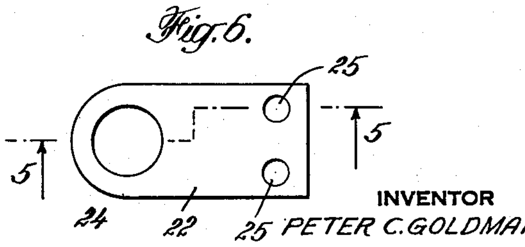

As shown in Figs. 4 and 6, the holes in the metal spring are advantageously larger than the holes in the damping layers 23. Since the spring is not in direct contact with the spindle 21 or the mounting screws 26, it is cushioned in a lateral direction by the damping layers 23. It is also cushioned in a vertical direction inasmuch as it is sandwiched between the layers. Thus, although the spring is securely clamped to both spindle and pickup arm, it is cushioned with respect thereto to provide insulation from shocks and vibration. The damping layers also provide mechanical resistance to any such vibrations or to oscillations of the pickup arm due to resonance effects.

As explained hereinbefore, such resonance effects may be produced by the resonance between the compliance in the mounting of stylus 12 and the mass of arm 10. As shown in Fig. 1, when the arm is in position for playing a record, spring 22 is bent downwards due to the slope of abutment 31, and hence provides a force which partially counteracts the weight of arm 10 and reduces the pressure of stylus 12 on a record surface. If spring 22 were initially given an upward curve in its unstrained position, the clamping surface of abutment 31 could be made horizontal.

Damping sheets 23 are of flexible material having high mechanical resistance and low restoring force. Damping materials possessing considerable elastic lag are advantageous. Such materials, upon being bent or flexed, return slowly to their initial condition. Viscous solids are especially desirable. These damping sheets provide substantial mechanical resistance to movement of the arm in a vertical direction, and hence damp resonant oscillations on that arm in that direction. It is also found that the arm assembly as described possesses substantial damping to lateral oscillations as shown by the fact that the resonant peak in the output of the pickup cartridge is substantially damped. The low-frequency resonant peak due to resonance of the arm mass with the compliance of the stylus suspension, for laterally-cut records, may easily be reduced to within 1 or 2 db of the non-resonant portion of the characteristic.

The damping sheets have the additional useful feature that if the arm is raised off the record and dropped by accident, the head of the arm drops slowly onto the record surface and does not damage either the stylus or the record. This feature may be intentionally employed in record players of the type described in co-pending application Serial No. 19,923 filed April 9, 1948, by Peter C. Goldmark and Daniel P. Doncaster.

The dimensions of the sheets of damping material may be chosen with respect to their mechanical properties to give the desired amount of damping for the particular arm involved.

The metallic leaf spring 22 is important in determining the rest position of the arm and in supplying a restoring force which tends to maintain the desired needle pressure on a record. It is found that, even though the arm drops slowly upon release from an elevated position, there is no difficulty in following normal irregularities in records or in following warped records.

While "Pyralin" vibration damp stock has been mentioned specifically and is preferred at the present time, other flexible materials having physical properties described hereinbefore may be employed if desired.

The coupling of the arm may be designed for mounting on a plate located above the arm, as described in application Serial No. 19,923 supra, rather than for mounting on a plate below the arm, as shown in Fig. 1.

The invention has been described in connection with a specific embodiment and various modifications have been mentioned. It will be understood that other modifications are possible within the spirit and scope of the invention.

I claim:

1. A phonograph reproducer arm assembly comprising a reproducer arm, a support for said arm, a coupling arranged for lateral rotation about said support, a metal spring attached at spaced points thereof to said reproducer arm and to said coupling, respectively, to allow vertical angular movement of the arm, a stylus mounting on said arm at a point remote from said coupling, and a flexible damping material having a high ratio of mechanical resistance to restoring force extending between said reproducer arm and coupling and affixed to the arm and to the coupling to provide mechanical resistance to angular movement of the arm in the vertical direction.

2. A phonograph reproducer arm assembly comprising a reproducer arm, a support for said arm, a coupling arranged for lateral rotation about said support, a metal spring attached at spaced points thereof to said reproducer arm and to said coupling, respectively, to allow vertical angular movement of the arm, a stylus mounting on said arm at a point remote from said coupling, and a sheet of viscous damping material extending between said reproducer arm and coupling and affixed to the arm and to the coupling to provide substantial mechanical resistance to angular movement of the arm in the vertical direction.

3. A phonograph reproducer arm assembly comprising a substantially rigid reproducer arm, a support for said arm, a vertical pivotal coupling arranged for lateral rotation about said support, a flat horizontally-disposed leaf spring attached at spaced points thereof to said reproducer arm and to said coupling, respectively, to allow vertical angular movement of the arm, a stylus mounting on said arm at a point remote from said coupling, and an element of flexible damping material having substantial mechanical resistance extending between said reproducer arm and coupling and affixed to the arm and to the coupling to provide substantial mechanical resistance to angular movement of the arm in the vertical direction.

4. A phonograph reproducer arm assembly comprising a substantially rigid reproducer arm, a support for said arm, a vertical pivotal coupling arranged for lateral rotation about said support, a flat horizontally-disposed leaf spring attached at spaced points thereof to said reproducer arm and to said coupling, respectively, to allow vertical angular movement of the arm, a stylus mounting on said arm at a point remote from said coupling, and a sheet of flexible damping material having substantial mechanical resistance and elastic lag extending between said reproducer arm and coupling, said damping material being affixed to the arm and to the coupling and substantially contiguous with said flat spring to provide mechanical resistance to angular movement of the arm in the vertical direction.

5. A phonograph reproducer arm assembly comprising a substantially rigid reproducer arm, a vertical bearing for said arm allowing lateral angular movement thereof, a flat horizontally-disposed metallic leaf spring attached at spaced points thereof to said arm and to said vertical bearing, respectively, to allow vertical angular movement of the arm, a pickup cartridge for mounting a stylus on said arm at a point remote from said bearing, and an element of viscous damping material having substantial mechanical resistance and elastic lag extending between said reproducer arm and bearing and affixed to the arm and to the bearing to provide substantial mechanical resistance to angular movement of the arm in the vertical direction.

6. A phonograph reproducer arm assembly for reproducing laterally-modulated sound grooves which comprises a substantially rigid reproducer arm, a vertical bearing for said arm allowing lateral angular movement thereof, a flat horizontally-disposed metallic leaf spring attached at spaced points thereof to said arm and to said vertical bearing, respectively, to allow vertical angular movement of the arm, a pickup cartridge for mounting a stylus on said arm at a point remote from said bearing with vertical and lateral compliance between the stylus and the arm, said stylus and cartridge being adapted to engage laterally-modulated sound grooves for reproducing sound therefrom, said spring being short compared to the length of said arm and mounted to bend from its unstrained position to at least partially counteract the weight of the arm when the stylus engages a record, and at least one sheet of flexible damping material having substantial mechanical resistance extending between said arm and bearing substantially contiguously with said spring and affixed to the arm and to the bearing to provide substantial mechanical resistance to angular movement of the arm in the vertical direction, whereby slow dropping of the arm and substantial damping of oscillations thereof may be obtained.

7. A phonograph reproducer arm assembly for reproducing laterally-modulated sound grooves which comprises a substantially rigid reproducer arm, a vertical bearing for said arm allowing lateral angular movement thereof, a flat horizontally-disposed metallic leaf spring attached at spaced points thereof to said arm and to said vertical bearing, respectively, to allow vertical angular movement of the arm, a pickup cartridge mounting a stylus at the end of said arm remote from the bearing with compliance between the stylus and the arm, said spring being short compared to the length of said arm and mounted to bend from its unstrained position to at least partially counteract the weight of the arm when the stylus engages a record, a pair of flat sheets of a pliable damping material having substantial mechanical resistance and elastic lag contiguous with respective opposite sides of said spring and affixed to said reproducer arm and to said bearing at respective opposite ends thereof, said sheets providing substantial mechanical resistance to angular movement of the arm in the vertical direction, whereby slow dropping of the arm and substantial damping of oscillations thereof may be obtained.

8. A phonograph reproducer arm assembly for reproducing laterally-modulated sound grooves which comprises a substantially rigid reproducer arm, a vertical bearing for said arm allowing lateral angular movement thereof, a flat horizontally-disposed metallic leaf spring attached at spaced points thereof to said arm and to said vertical bearing, respectively, to allow vertical angular movement of the arm, a pick-up cartridge for mounting a stylus on said arm at a point remote from said bearing with vertical and lateral compliance between the stylus and the arm, said stylus and cartridge being adapted to engage laterally-modulated sound grooves for reproducing sound therefrom, said spring being short compared to the length of said arm and mounted to bend from its unstrained position to at least partially counteract the weight of the arm when the stylus engages a record, and at least one sheet of a pliable cellulose nitrate plastic having substantial mechanical resistance and elastic lag extending between said arm and bearing substantially contiguously with said spring and affixed to the arm and to the bearing to provide substantial mechanical resistance to angular movement of the arm in the vertical direction, whereby slow dropping of the arm and substantial damping of oscillations thereof may be obtained.

9. A phonograph reproducer arm assembly comprising a substantially rigid reproducer arm, a vertical bearing for said arm allowing lateral angular movement thereof, a flat metallic leaf spring having a sheet of pliable viscous material contiguous with each side thereof forming a composite connecting member, means clamping one end of said composite connecting member to said reproducer arm and means clamping the other end of said composite connecting member to said vertical bearing, said metallic leaf spring being horizontally disposed to allow vertical angular movement of the arm and at least one end thereof being cushioned in said sheets of viscous material in the lateral direction, and a pickup cartridge mounting a stylus near the end of said arm remote from said bearing with vertical and lateral compliance between the stylus and the arm, said viscous material providing such mechanical resistance to angular movement of the arm in a vertical direction that slow dropping of the arm and substantial damping of low-frequency oscillations of said compliance and the mass of said arm is obtained.

10. A phonograph reproducer arm assembly for reproducing laterally-modulated sound grooves which comprises a substantially rigid reproducer arm, a vertical bearing for said arm allowing lateral angular movement thereof, a flat metallic leaf spring, a sheet of pliable viscous material having substantial mechanical resistance and elastic lag contiguous with each side of said spring forming a composite connecting member, means clamping one end of said composite connecting member to said reproducer arm and means clamping the other end of said composite connecting member to said vertical bearing, said metallic leaf spring being horizontally disposed to allow vertical angular movement of the arm and at least one end thereof being cushioned in said sheets of viscous material in the lateral direction, and a pickup cartridge mounting a stylus near the end of said arm remote from said bearing with vertical and lateral compliance between the stylus and the arm, said spring being short compared to the length of said arm and mounted to bend from its unstrained position to at least partially counteract the weight of the arm when the stylus engages a record, said viscous material providing such mechanical resistance to angular movement of the arm in a vertical direction that slow dropping of the arm and substantial damping of low-frequency oscillations of said compliance and the mass of said arm is obtained.

References Cited in the file of this patent

UNITED STATES PATENTS

| Number | Name | Date |
|---|---|---|
| 2,177,692 | DiToro | Oct. 31, 1939 |
| 2,182,138 | Semple et al. | Dec. 5, 1939 |
| 2,363,655 | Dally | Nov. 28, 1944 |
| 2,368,198 | Brown et al. | Jan. 30, 1945 |
| 2,369,087 | Thompson | Feb. 6, 1945 |
| 2,455,466 | Brubaker | Dec. 7, 1948 |
| 2,488,608 | Sinnett | Nov. 22, 1949 |
| 2,541,430 | Molton | Feb. 13, 1951 |